July 7, 1931.  J. H. GARDNER  1,813,490
ICE CREAM FREEZER
Filed July 14, 1928

Inventor:
John H. Gardner.
By Brayton G Richards
Atty.

Patented July 7, 1931

1,813,490

UNITED STATES PATENT OFFICE

JOHN H. GARDNER OF CHICAGO, ILLINOIS

ICE CREAM FREEZER

Application filed July 14, 1928. Serial No. 292,695.

The invention relates to improvements in ice cream freezers of the type employing an outer receptacle having a container rotatably mounted therein and containing a freezing mixture, the ice cream or other confection being placed in said receptacle and freezing in a thin coating on the periphery of said rotatable container, means being provided for scraping the frozen matter from said periphery. The primary object of the present invention is to provide an improved device of this character which is efficient in operation and capable of economical production.

Another object of the invention is to provide an improved closure for the freezing mixture container.

Another object of the invention is to provide improved means for rotating said freezing mixture container.

Other objects will appear hereinafter.

The invention consists in the combinations and arrangements of parts hereinafter described and claimed.

Figure 1:
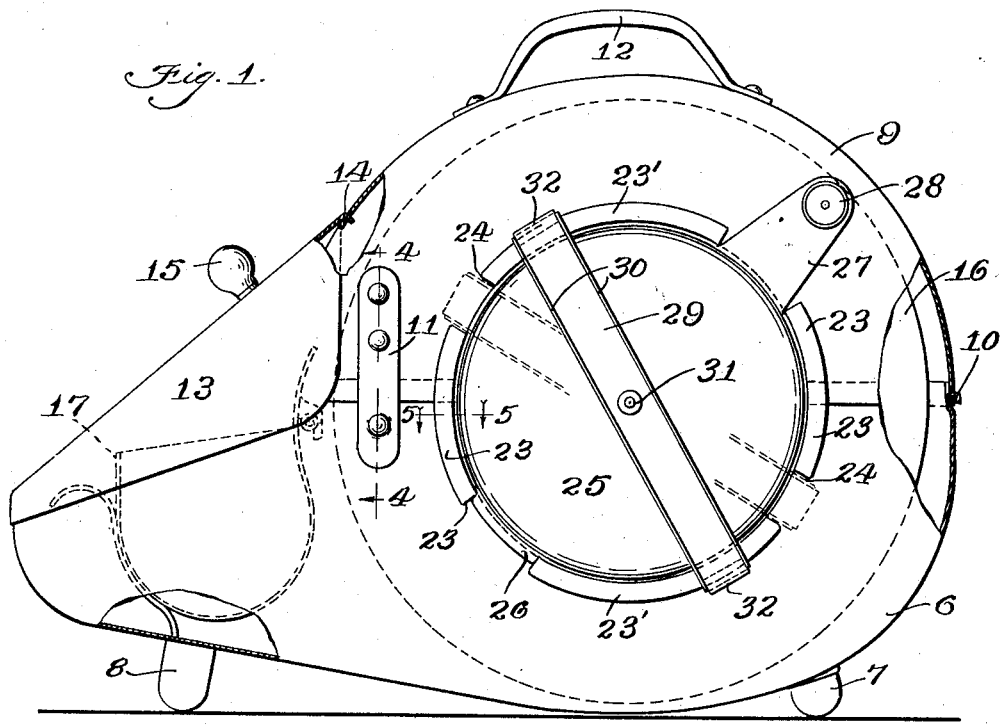

The invention will be best understood by reference to the accompanying drawings forming a part of this specification, and in which Fig. 1 is a side view, shown partially in section, of an ice cream freezer embodying the invention.

Figure 2:
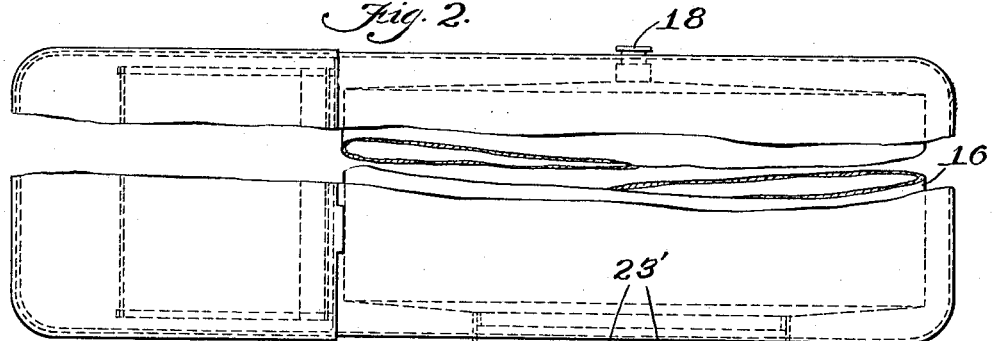

Fig. 2, a partial top plan view of the same with the central portion removed.

Figures 3, 5:

Fig. 3, a detailed view of the closure employed in the construction.

Figure 4:
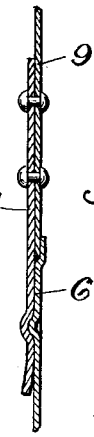

Fig. 4, an enlarged section taken substantially on line 4—4 of Fig. 1, and

Fig. 5, an enlarged section taken substantially on line 5—5 of Fig. 1.

The preferred form of construction as illustrated in the drawings comprises an outer receptacle or casing 6, preferably of sheet metal and provided with suitable lugs or supports 7 and 8, adapting the same to rest upon a table top, or the like. The receptacle 6 is provided with a removable top portion 9 having a hook connection 10 with the receptacle 6, and also a leaf spring connection 11 with said receptacle, and whereby said cover portion may be readily removed when desired. The cover 9 is provided with a suitable handle 12 to facilitate manipulations thereof. A readily removable door 13 is also provided for said receptacle, said door being hung upon removable hooks 14 and provided with a handle 15 for convenience in removing and replacing the same. A revolving cylindrical container 16, also preferably of sheet metal, is rotatably mounted in the said receptacle, said container cooperating with a tiltable scraper trough 17, mounted as indicated under the door 13, and adapted and arranged to be titlted into scraping relation with the periphery of the container 16 for removal of the coating of frozen confection thereon, as will be readily understood.

The container 16 is rotatably mounted at one end by means of a grooved stud 18 secured axially to said container and given a bearing in the corresponding wall of the outer casing or receptacle. At its other end the casing 16 is provided with an enlarged mouth giving access to the interior thereof for the purpose of filling the same with freezing mixture. This mouth is surrounded by a projecting neck 19, wh'ch is also given a rotatable bearing in the corresponding wall of the receptacle, and whereby the container 16 is mounted for rotation in the receptacle, as will be readily understood. At its outer end the neck 19 is provided with a gasket recess 20 in which is seated a rubber gasket 21, as shown. An outwardly extending securing flange 22 is formed at the outer edge of the gasket recess 20, said flange and recess being provided with two sets of diametric notches 23 and 24, as shown. An outwardly bulged or domed disclike closure plate 25 is arranged to fit loosely within the gasket recess 20 to rest upon the gasket 21 therein. The closure 25 is provided at one side with a rigid lug 26, fitting into one of the notches 23, and at its other side with a crank arm 27 projecting through the other notch 23. At its outer end the crank arm 27 is provided with a crank handle 28 for rotating the container 16. The closure 25 also carries a clamping arm 29, having reinforcing flanges 30 along its edges and pivoted at 31 to the center of the closure 25. At its ends the clamping arm 29 is provided with inwardly extending hooklike lips 32, adapted and arranged to pass through the notches 24 and engage under the flange 23. The flange 23 is given an inward inclination adjacent corresponding sides of the notches 24, said inclination being indicated at 23' in Fig. 2. By this arrangement, when the closure 25 is placed in the gasket recess resting upon the gasket 21, the hook lips 32 of the clamping arm 29 may be engaged with the flange portions 23' through the notches 24, and said clamping arm rotated to the right or in a clockhandwise direction and whereby the flange portions 23' will act as screw cams to draw the closure 25 into close and sealing engagement with the gasket 21, thereby sealing the mouth of the container 16 against escape of the freezing mixture therefrom. The engagement of the lug 26 and the crank arm 27 with the notches 23 prevents rotation of the closure 25 relatively to the container 16, so that the crank handle 28 may be employed for the purpose of rotating the container 16 against the resistance of the scraping action of the trough 17. In this manner a simple and effective closure is provided for the container 16, which also constitutes a simple and effective means for rotating the same in the normal operation of the device. The specific form and arrangement of parts constitutes a simple and effective one for the purpose.

While I have illustrated and described the preferred form of construction for carrying my invention into effect, this is capable of variation and modification without departing from the spirit of the invention. I therefore do not wish to be limited to the precise details set forth, but desire to avail myself of such variations and modifications as fall within the scope of the appended claims.

Having thus fully described my invention, what I claim as new and desire to secure by Letters Patent is:

1. The combination of a rotatable container provided with a filling mouth surrounded by a neck having an annular gasket recess at its outer end; a gasket in said recess; an outwardly extending flange at the outer edge of said gasket recess, there being notches in said flange; a closure fitting into said recess onto said gasket and having a rigid projection engaging one of said notches; a clamping member pivoted to said closure and provided at its ends with engaging lips fitting through notches of said flange and engaging under the latter to lock said closure in place; a crank arm on said closure and projecting through a notch of said flange; and a crank handle at the outer end of said crank arm.

2. An ice cream freezer comprising an outer receptacle; a container for a freezing mixture rotatably mounted in said receptacle, said container being provided at one end with a bearing stud having a bearing in the corresponding wall of said receptacle and at its other end with a filling mouth surrounded by a neck protruding through a bearing in the corresponding wall of said receptacle, said neck having an annular gasket recess at its outer end; a gasket in said recess; an outwardly extending flange at the outer edge of said gasket recess, there being notches in said flange; a closure fitting into said recess onto said gasket and having a rigid projection engaging one of said notches; a clamping member pivoted to said closure and provided at its ends with engaging lips fitting through notches of said flange and engaging under the latter to lock said closure in place; a crank arm on said closure and projecting through a notch of said flange; and a crank handle at the outer end of said crank arm.

JOHN H. GARDNER.